(12) United States Patent
Roetker et al.

(10) Patent No.: US 8,349,942 B2
(45) Date of Patent: Jan. 8, 2013

(54) INTERMEDIATE TRANSFER MEMBER

(75) Inventors: Michael S. Roetker, Webster, NY (US);
Francisco J. Lopez, Rochester, NY
(US); Kyle B. Tallman, Farmington, NY
(US); Jonathan H. Herko, Walworth,
NY (US); David W. Martin, Walworth,
NY (US); Scott J. Griffin, Fairport, NY
(US); Mandakini Kanungo, Penfield,
NY (US); Yuhua Tong, Webster, NY
(US)

(73) Assignee: Xerox Corporation, Norwalk, CT (US)

( * ) Notice: Subject to any disclaimer, the term of this patent is extended or adjusted under 35 U.S.C. 154(b) by 86 days.

(21) Appl. No.: 13/104,448

(22) Filed: May 10, 2011

(65) Prior Publication Data
US 2012/0288788 A1 Nov. 15, 2012

(51) Int. Cl.
*C08K 3/04* (2006.01)

(52) U.S. Cl. ........ 524/495; 524/496; 524/611; 524/612; 524/847

(58) Field of Classification Search ............... 524/495, 524/496, 611, 612, 847; 977/734, 735, 736, 977/737, 738, 739, 740, 741, 742, 743, 744, 977/745, 746, 747, 748, 749, 750, 751, 752, 977/753
See application file for complete search history.

(56) References Cited

U.S. PATENT DOCUMENTS

2010/0273100 A1* 10/2010 Yu et al. ............... 430/58.05

\* cited by examiner

*Primary Examiner* — Ling Choi
*Assistant Examiner* — Darcy D Laclair Lynx
(74) *Attorney, Agent, or Firm* — Hoffman Warnick LLC

(57) ABSTRACT

Described herein is an intermediate transfer member that includes a layer of phenoxy resin having dispersed therein graphene particles.

15 Claims, 4 Drawing Sheets

INTERMEDIATE TRANSFER MEMBER

BACKGROUND

1. Field of Use

This disclosure is directed to an image forming apparatus and an intermediate transfer member.

2. Background

Image-forming apparatuses in which a color or black and white image is formed by using an intermediate transfer member to electrostatically transfer toner are well known. When an image is formed on a sheet of paper in a color image forming apparatus using such an intermediate transfer member, four color images in yellow, magenta, cyan and black respectively are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor and superimposed on an intermediate transfer member, and then transferred to a sheet of paper.

Intermediate Transfer Belts (ITB), designed for toner image transfer for high speed machines, must have and maintain required electrical conductivity. To maintain the required conductivity, conductive components are added into a polymer matrix used to form the intermediate transfer belt. Although various types of electrical conductive materials can be used in ITB, carbon black is the most common conductive component. As filler in an ITB, carbon black addition leads to lower break strength and tear resistance, which can cause cracks leading to failure of the ITB during machine operation. In many cases, carbon black content in ITB could be up to 30% by weight. Higher carbon black loading in ITB results in lower tear resistance in ITB thereby decreasing the lifetime of ITB. For flow coating, the selection of carbon black and polymeric resin is limited due to many process requirements. Therefore, there is a need to achieve required electrical conductivity with reduced electrical conductive filler content to increase the robustness and lifetime of the ITB. In addition, carbon black decreases the transparency of ITBs. This requires the use of reflective sensors in electrophotographic machines. A transmissive ITB would allow the use of transmissive sensors.

SUMMARY

Described herein is an intermediate transfer member that includes a layer comprising a phenoxy resin having dispersed therein graphene particles at a loading of from about 0.1 weight percent to about 3.0 weight percent of the layer.

Disclosed is an intermediate transfer member that includes a surface layer comprising a phenoxy resin having dispersed therein graphene particles at a loading of from about 0.1 weight percent to about 3.0 weight percent of the layer wherein the phenoxy resin has the structure:

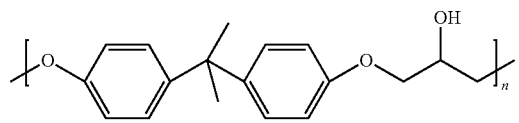

wherein n is from about 40 to about 400 wherein the layer comprises a transparency of about 70 percent at a wavelength of 700 nm.

Described herein is an intermediate transfer member. The intermediate transfer member comprises a layer comprising a phenoxy resin having dispersed therein graphene particles at a loading of from about 0.1 weight percent to about 3.0 weight percent of the layer wherein the phenoxy resin has the structure:

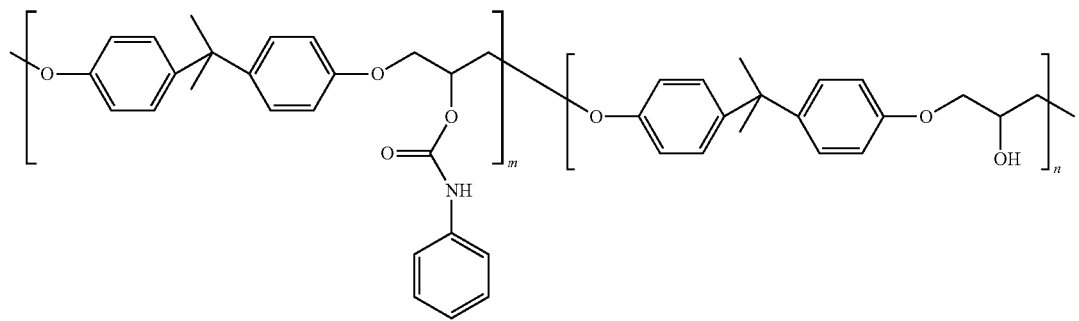

wherein m is from about 1 to about 399 and n is from about 399 to about 1.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
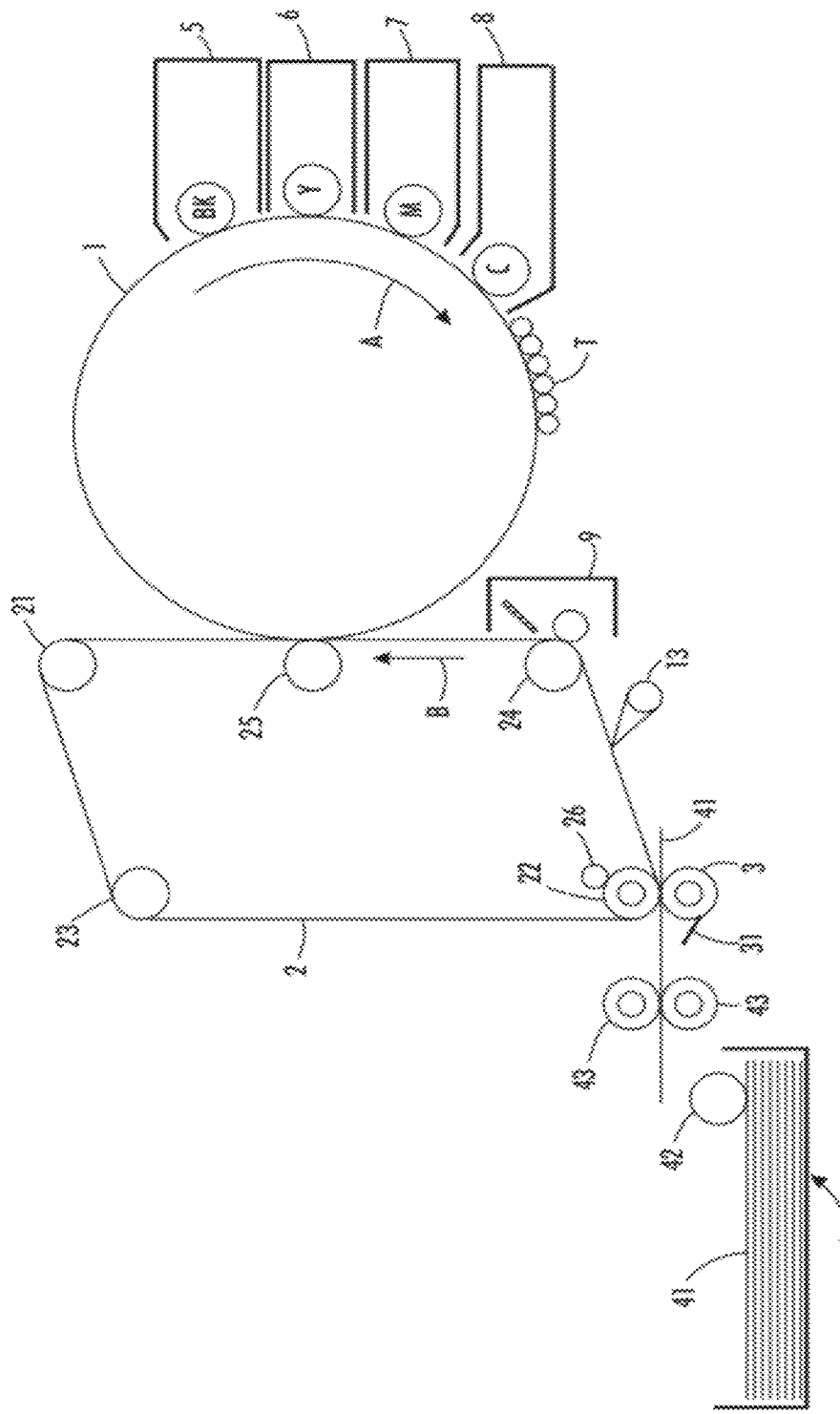
FIG. 1 is a schematic illustration of an image apparatus.

Referring to FIG. 1, an image-forming apparatus includes an intermediate transfer member as described in more detail below. The image forming apparatus is an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also, in the image forming apparatus, the intermediate transfer member may be provided as a transfer-conveying member in the transfer region for transferring the toner image onto the transfer material. Having an intermediate transfer member that transfers images of high quality and remains stable for a long period is required.

The image forming apparatus described herein is not particularly limited as far as it is an image forming apparatus of intermediate transfer type, and examples include an ordinary monochromatic image forming apparatus accommodating only a monochromatic color in the developing device, a color image forming apparatus for repeating primary transfer of the toner image carried on the image carrier sequentially on the intermediate transfer member, and a tandem color image forming apparatus having plural image carriers with developing units of each color disposed in series on the intermediate transfer member. More specifically, the image forming apparatus may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and other known methods as required.

As the image carrier, a known one may be used. As the image carrier's photosensitive layer, an organic system, amorphous silicon, or other known material may be used. In the case of an image carrier of cylindrical type, the image carrier is obtained by a known method of molding aluminum or aluminum alloy by extrusion and processing the surface. A belt form image carrier may also be used.

The charging unit is not particularly limited and known chargers may be used, such as a contact type charger using conductive or semiconductive roller, brush, film and rubber blade, scorotron charger or corotron charge making use of corona discharge, and others. Above all, the contact type charging unit is preferred from the viewpoint of excellent charge compensation capability. The charging unit usually applies DC current to the electrophotographic photosensitive material, but AC current may be further superimposed.

The exposure unit is not particularly limited, for example, an optical system device, which exposes a desired image on the surface of the electrophotographic photosensitive material by using a light source such as semiconductor laser beam, LED beam, liquid crystal shutter beam or the like, or through a polygonal mirror from such light source, may be used.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used.

The second transfer unit may be the same as the first transfer unit, such as a contact type transfer charger using transfer roller and others, scorotron transfer charger, and corotron transfer charger. By pressing firmly using the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be performed.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image-forming apparatus for repeating primary transfer is shown schematically in FIG. 1. The image forming apparatus shown in FIG. 1 includes a photosensitive drum 1 as image carrier, an intermediate transfer member 2, shown as an intermediate transfer belt, a bias roller 3 as transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and feed rollers 43.

In the image forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the intermediate transfer member 2, and the primary transfer is executed by rotation of the intermediate transfer member 2 in the direction of arrow B.

Similarly, a toner image of a second color, a toner image of a third color, and a toner image of a fourth color are sequentially formed and overlaid on the transfer belt 2, and a multi-layer toner image is formed.

The multi-layer toner image transferred on the transfer belt 2 is brought to the secondary transfer unit comprising the bias roller 3 by rotation of the transfer belt 2. The secondary transfer unit comprises the bias roller 3 disposed at the surface side carrying the toner image of the transfer belt 2, backup roller 22 disposed to face the bias roller 3 from the back side of the transfer belt 2, and electrode roller 26 rotating in tight contact with the backup roller 22.

The paper 41 is taken out one by one from the paper block accommodated in the paper tray 4 by means of the pickup roller 42, and is fed into the space between the transfer belt 2 and bias roller 3 of the secondary transfer unit by means of the feed roller 43 at a specified timing. The fed paper 41 is conveyed under pressure between the bias roller 3 and backup roller 22, and the toner image carried on the transfer member 2 is transferred thereon by rotation of the transfer member 2.

The paper 41 on which the toner image is transferred is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31, made of polyurethane or the like, may be always in contact, and toner particles, paper dust, and other foreign matter sticking by transfer are removed.

In the case of transfer of a monochromatic image, the toner image T after primary transfer is immediately sent to the secondary transfer process, and is conveyed to the fixing device. But in the case of transfer of a multi-color image by combination of plural colors, the rotation of the intermediate transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and intermediate transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a drelt (a cross between and drum and a belt), a belt including an endless belt, an endless seamed flexible belt, an endless seamless flexible imaging belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the substrate can be by any suitable technique conventionally used in electrophotography, such as corona transfer, pressure transfer, bias transfer, combinations of those transfer means, and the like.

As shown in FIG. 1, intermediate transfer member 2, in this embodiment a belt, is suspended on rollers (suspension rollers) 21, 22, 23 and 24 in an electrophotographic apparatus, and is driven in a tensed state for a long period of time. For this reason, the intermediate transfer belt is required to have sufficient strength and durability. Mechanical properties of special interest for intermediate transfer members are: Young's modulus (E), and flexural strength. YM(E), describes tensile elasticity; flexural strength, describes the ability of the film to resist bending. When an intermediate transfer member has a low YM(E), the belt is more prone to distortion, which will affect belt integrity and ultimately belt life. Belt distortion also negatively affects image registration. Low flexural strength, on the other hand, can cause belt rupture or fracture. In order to prevent scratches due to toner carrier, many intermediate transfer belts utilize a multi-layer structure comprising a substrate made from a resin composition containing a crystalline thermoplastic resin, and a high-hardness layer formed on the surface. However, when an intermediate transfer member has such a high-hardness layer formed thereon, the high-hardness layer needs to be a thin enough film so as to not deteriorate the flexural strength of the multi-layered member. These added parameter restrictions add a higher level of complexity and time to thin film preparation.

In addition, a transmissive ITB is desirable to save space in the electrophotographic apparatus. Color and density corrections based on toner concentrations are accomplished by taking reflective measurements on small toner patches on the ITB. The results of these measurements are used to modify machine settings to properly reproduce the desired color and density of the final images. The detectors for these toner patches are located around the outside of the ITB taking up space that can either be consolidated to provide a smaller image forming apparatus or used to add other functional devices that will provide improved features to the image forming apparatus. A transmissive ITB allows for the detectors to be placed in the void spaces behind the ITB and still be able to perform the necessary measurements to achieve final images with the correct color and density.

Figure 2:
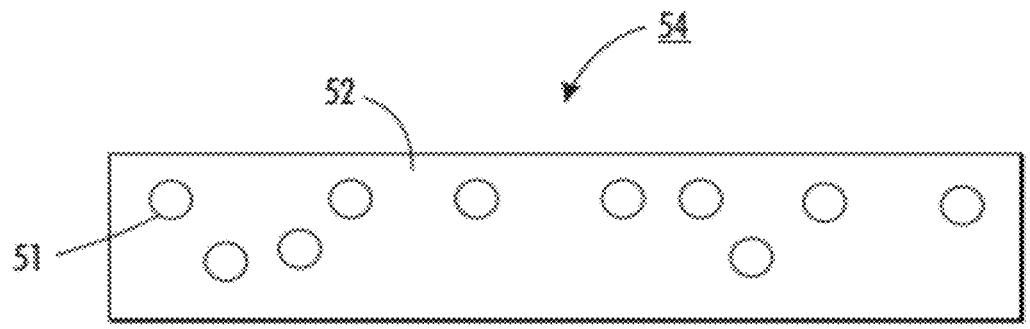
FIG. 2 is a schematic representation of an embodiment disclosed herein.

In an embodiment shown in FIG. 2, the intermediate transfer member 54 is in the form of a film in a one layer configuration. The intermediate transfer member 54 includes a single layer of a phenoxy resin 52. The single layer further contains graphene particles 51. The single layer can contain other polymers and fillers.

Figure 3:
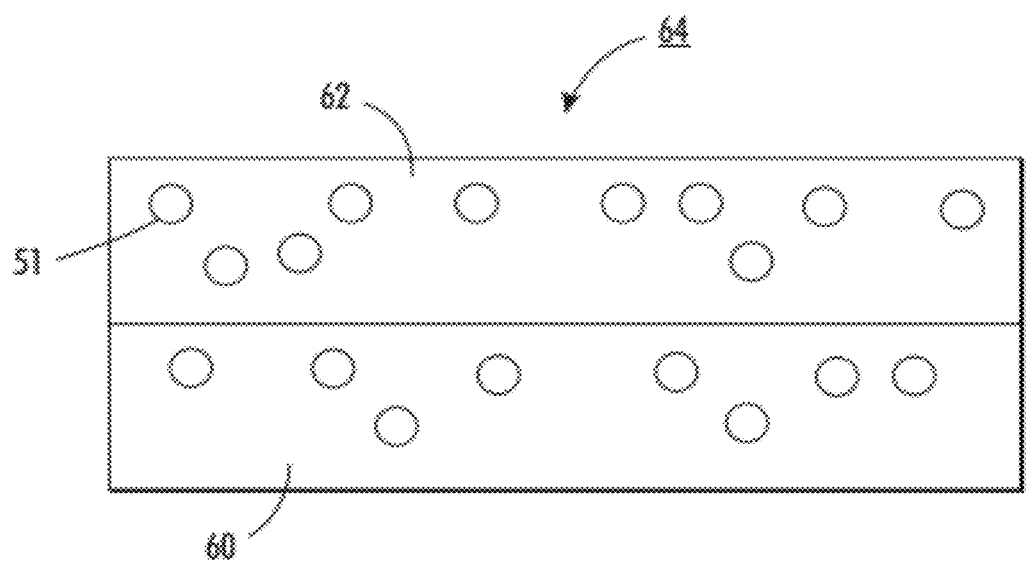
FIG. 3 is a schematic representation of an embodiment disclosed herein.

In an embodiment shown in FIG. 3, the intermediate transfer member 64 is in the form of a film in a two layer configuration. The intermediate transfer member 64 includes a substrate layer 60. An outer layer of phenoxy resin 62 is positioned on the substrate layer 60. The outer layer is shown containing graphene particles 51. Both the substrate layer and the outer layer can contain other polymers and fillers. Unlabeled particles are shown in the substrate layer which could be any of the listed conductive particles described herein. The substrate layer 60 can be made from a number of different materials, including polyesters, polyurethanes, polyimides, fluorinated polyimides, polyolefins (such as polyethylene and polypropylene, polyethylene-co-polytetrafluoroethylene), polyamides (including polyamideimides), polyetherimides, polyphenylene sulfides, polysulfones, polycarbonates, PVDF or acrylics, or blends or alloys of such materials.

In general, the intermediate transfer belt is composed of phenoxy resin and graphene particles. Because the belt needs to be rotating on rollers during machine operation, the ITB belt must have certain modulus and break strength. Polymeric composites with higher loading of fillers ITB result in lowering the break strength. To reduce the content of fillers in ITB, high electrical conductive materials must be selected. Graphene particles are a high electrical conductive material.

Disclosed herein is an ITB using the material graphene particles for the conductive component. The graphene particles are dispersed in a polymer matrix of phenoxy resin. The ITB with graphene had very good flexibility, transparency, and break strength. For example, with phenoxy resin as a binder, only 2.0 weight percent graphene particles are needed to achieve a surface resistivity of $10\Omega/\square$ by common logarithm, while 15 weight percent content of carbon black Special Black 4, available from Evonik-Degussa, is needed for the same surface resistivity. An ITB with graphene particles, approximately 2.0 weight percent, showed very good transparency in visible light wavelength range. At a wavelength of 700 nm, the transparency of ITB film with graphene was 70%, compared to 0% transparency for the ITB film with carbon black Special Black 4. The transparency of the phenoxy-graphene particle ITB is from about 60 percent transmission to about 80 percent transmission at wavelengths of from about 400 nanometers to about 1000 nanometers. It should be noted that transparency in ITB is important for good color registration of toners. In addition, it is easier to find out defects or cracks in a transparent belt for better quality control. Previously, it was difficult to achieve transparency in an ITB because of the high loading of carbon black that was needed to achieve the required electrical conductivity. The break strength of the phenoxy-graphene particle ITB is from about 50 MPa to 90 MPa, or from about 52 MPa to about 80 MPa, or from about 55 MPa to about 70 MPa.

Figure 4:
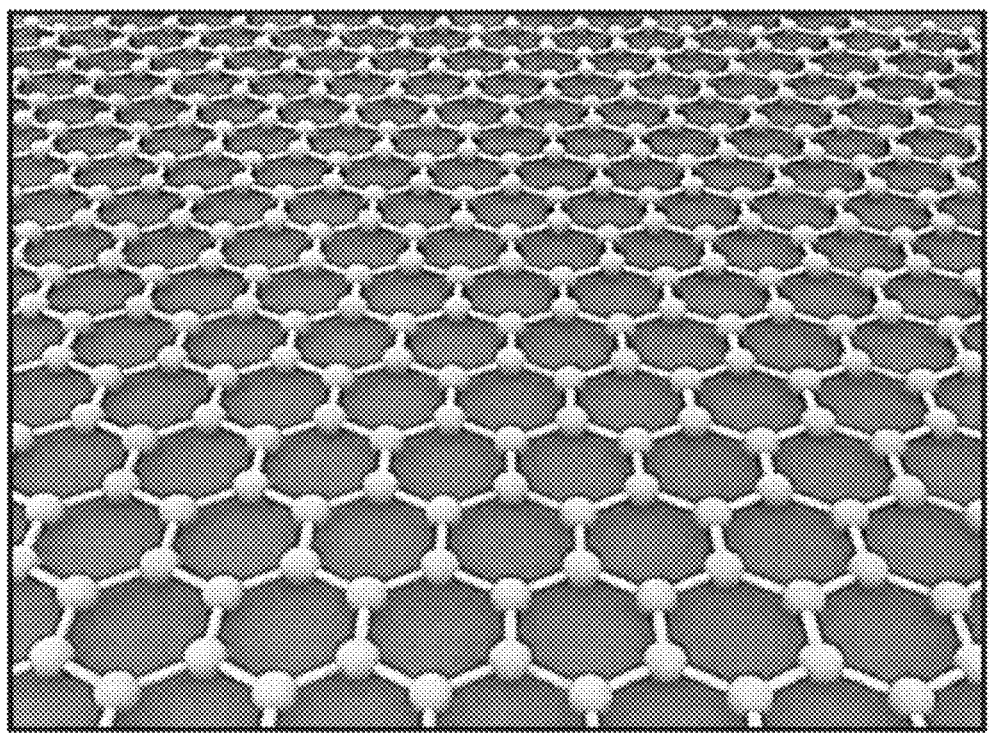
FIG. 4 shows the structure of graphene.

The structure of graphene is shown in FIG. 4. Graphene is a flat monolayer of carbon atoms tightly packed into a 2D honeycomb lattice. Graphene is a one-atom-thick planar sheet of $sp^2$-bonded carbon atoms that are densely packed in a honeycomb crystal lattice. The crystalline or "flake" form of graphite consists of many graphene sheets stacked together. Graphene is the basic structural element of some carbon allotropes including graphite, charcoal, carbon nanotubes, and fullerenes. It can also be considered as an indefinitely large aromatic molecule, the limiting case of the family of flat polycyclic aromatic hydrocarbons. Experimental results from transport measurements show that graphene has remarkably high electron mobility at room temperature, with reported values in excess of 15,000 $cm^2V^{-1} s^{-1}$. The corresponding resistivity of the graphene sheet would be $10^{-6}$ $\Omega \cdot cm$. This is less than the resistivity of silver, the lowest resistivity substance known at room temperature.

The single layer intermediate transfer member shown in FIG. 2 for electrophotographic imaging applications uses a phenoxy resin, with graphene particles. Graphene particles achieve the required conductivity at a loading of from about 0.1 weight percent to about 3.0 weight percent, or from about 0.5 weight percent to about 2.5 weight percent, or from about 1.0 weight percent to about 2.0 weight percent of the single layer.

The multi-layer intermediate transfer member shown in FIG. 3 uses a phenoxy resin with graphene in the outermost layer. Graphene achieves the required conductivity at a loading of from about 0.1 weight percent to about 3.0 weight percent, or from about 0.5 weight percent to about 2.5 weight percent, or from about 1.0 weight percent to about 2.0 weight percent of the outermost layer.

Phenoxy resins are tough and ductile thermoplastic materials having a high cohesive strength and good impact resistance. This enables the phenoxy resin intermediate transfer member to have excellent mechanical properties. A single layer or multi-layer intermediate transfer member of phenoxy resin exhibits a Young's Modulus of from about 2,000 MPa to about 8,000 MPa, or from about 3,000 MPa to about 6,000 MPa or from about 4,000 MPa to about 5,000 MPa. The surface resistivity of the intermediate transfer member is easily tuned to proper resitivity. In addition, the cost of phenoxy resin is extremely low. The single layer intermediate transfer member of phenoxy resin provides a high performance intermediate transfer member at a low cost. The thickness of the single layer intermediate transfer member is from about 30 microns to about 400 microns, or from about 50 microns to about 200 microns, or from about 70 microns to about 150 microns.

The multi-layer intermediate transfer member of phenoxy resin also provides a high performance intermediate transfer member at a low cost. The thickness of the outer layer 62 is from about 1 micron to about 150 microns, or from about 10 microns to about 100 microns.

The graphene particles 51 dispersed in the single layer 52 or the outer layer 62 decrease the resistivity into the desired surface resistivity range of from about $10^8$ ohms/square, to about $10^{13}$ ohms/square, or from about $10^9$ ohms/square, to about $10^{12}$ ohms/square. The volume resistivity is from about $10^7$ ohm-cm to about $10^{12}$ ohm-cm, or from about $10^8$ ohm-cm to about $10^{11}$ ohm-cm. The resistivity can be provided by varying the concentration of the graphene particles 51. The graphene particles 51 may be present at a loading of from about 0.1 weight percent to about 3.0 weight percent, or from about 0.5 weight percent to about 2.5 weight percent, or from about 1.0 weight percent to about 2.0 weight percent of the respective layer 52 or 62.

Typical intermediate transfer members containing graphene particles have a water contact angle of greater that about 70°, or greater than about 80°, or greater than about 85°.

Phenoxy resins are tough and ductile thermoplastic materials having high cohesive strength and good impact resistance. The backbone ether linkages and pendant hydroxyl groups promote wetting and bonding to polar substrates and fillers such as carbon black. Structurally, phenoxy resin is a polyhydroxyether having terminal alpha-glycol groups.

Shown below is the structure of phenoxy resin

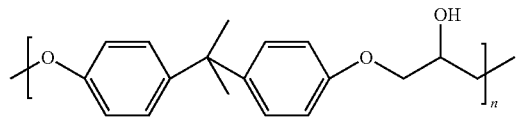

wherein n is from about 40 to about 400 or from about 70 to about 400 or from about 100 to about 350. The phenoxy resin is manufactured from polymers of bisphenol A and epichlorohydrin, polymers of bisphenol Z and epichlorohydrin, polymers of bisphenol AF and epichlorohydrin, polymers of bisphenol C and epichlorohydrin and polymers of bisphenol BP and epichlorohydrin.

Commercial phenoxy resins are available from InChem Corp., Rock Hill, S.C. including PKFE ($M_n$=16,000 and $M_w$=60,000), PKHB ($M_n$=9,500 and $M_w$=32,000), PKHC ($M_n$=11,000 and $M_w$=43,000), PKHH ($M_n$=13,000 and $M_w$=52,000), PKHJ ($M_n$=16,000 and $M_w$=57,000), and PKHP ($M_n$=13,000 and $M_w$=52,000).

Polydispersity of phenoxy resin is very narrow, typically less than 4.0. An average molecule contains forty or more regularly spaced hydroxyl groups suitable for crosslinking for thermoset applications. These pendant hydroxyls are excellent sites for crosslinking in thermoset applications at elevated temperatures and even at ambient conditions.

Phenoxy has excellent vapor barrier properties (water vapor, oxygen, carbon dioxide) and is compliant with 21CFR175.300 for direct and indirect food/beverage container coatings, as well as other paragraphs pertinent to adhesives used in multilayer packaging and plastic components for containers, which proves that phenoxy resin is a very environmently friendly material. In an embodiment, the phenoxy resin includes hydrophobic isocyanate chemical grafted onto the phenoxy resin. The structure is represented by:

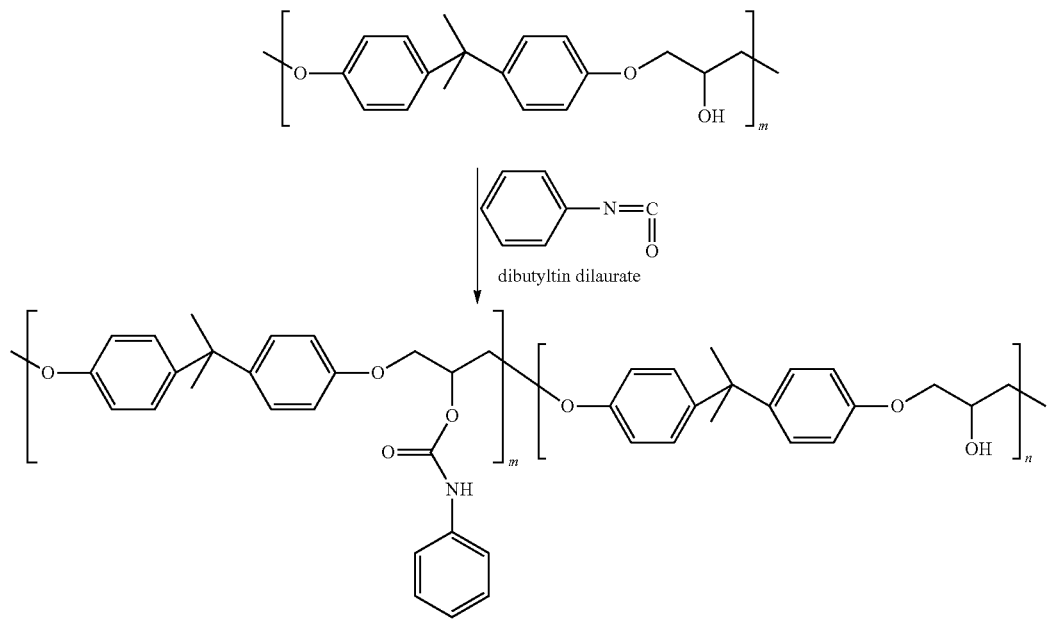

wherein m is from about 1 to about 399 and n is from about 399 to about 1. Dibutylin dilaurate is the catalyst. In addition to phenyl isocyantate grafted onto the phenoxy resin, by using polyisocyante and grafting that onto the phenoxy resin a crosslinked phenoxy resin can be obtained.

Examples of isocyanate that can be used to react with the phenoxy resin include phenyl isocyanate, 1,1,3,3-tetramethylbutyl isocyanate, 1-adamantyl isocyanate, 1-naphthyl isocyanate, 2,2-diphenylethyl isocyanate, 2,3,4-trifluorophenyl isocyanate, 2,4,5-trimethylphenyl isocyanate, 2-benzylphenyl isocyanate, 4,4'-methylenebis(phenyl isocyanate), and the like. Commercial polyisocyanates from Bayer Corp. can also be included, such as DESMODUR® N3200, N3300A, N75BA, CB72N, CB60N, CB601N, CB55N, BL4265SN, BL3475BA/SN, BL3370MPA, BL3272MPA, and BL3175A; MONDUR® M, CD, 582, 448, and 501.

In FIGS. 2 and 3, the phenoxy layer 52 and the outer phenoxy layer 62 can include a number of different polymeric materials, including polyesters, polyurethanes, polyimides, fluorinated polyimides, polyolefins (such as polyethylene and polypropylene, polyethylene-co-polytetrafluoroethylene), polyamides (including polyamideimides), polyetherimides, polyphenylene sulfides, polysulfones, polycarbonates, PVDF or acrylics, or blends or alloys of such materials.

In FIGS. 2 and 3, the phenoxy layer 52 and the outer phenoxy layer 62 can include a number of different conductive particles. The additional conductive particles can be selected from the group consisting of carbon black, acetylene black, fluorinated carbon black, metal oxides, doped metal oxides polyaniline, polythiophenes, polyacetylene, poly(-phenylene vinylene), polyp-phenyl sulfide), pyrroles, polyindole, polypyrene, polycarbazole, polyazulene, polyazepine, poly(fluorine), polynaphthalene and mixtures thereof.

A method of manufacturing the intermediate transfer member includes mixing graphene particles, phenoxy resin and a solvent to form a mixture. The mixture is coated on a substrate and dried. For a single layer intermediate transfer member, the dried coating is separated from the substrate.

Solvents useful for forming a solution of phenoxy resin and graphene particles include cyclohexanone, methyl ethyl ketone, benzyl alcohol, ethylenegylcol ethers, diethylenegylcol alkyl ethers, propylenegylcol alkyl ethers, phenoxypropanol, ethyl acetate, dibasic esters, tetrahydrofuran, N-methylpyrrolidone, diacetone alcohol, N,N'-dimethylformamide, N,N'-dimethylacetamide, methylene chloride and the like.

In an embodiment, a method of manufacturing an intermediate transfer member includes mixing graphene particles, phenoxy resin and a solvent to form a mixture. The mixture is mixed with phenoxy resin and a solvent to form a coating dispersion. The dispersion is coated on a substrate and dried. The dried coating is separated from the substrate. A two step process allows one to obtain the proper resistivity of in the final intermediate transfer member is a more simplified manner.

Typical techniques for coating such mixtures or dispersions on a substrate layer include flow coating, liquid spray coating, dip coating, wire wound rod coating, fluidized bed coating, powder coating, electrostatic spraying, sonic spraying, blade coating, molding, laminating, and the like.

Additives and additional fillers may be present in any of the above-described layers.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Preparation of ITB #91D: In a 120 ml glass bottle, graphene dispersion Vor-ink from VorbeckMaterials 1.05 g (solid content 11.8%) was mixed with 30 g of 20% phenoxy resin PKHH in solvent DMF. Then, surfactant Stepfac 8171 0.03 g and fluoropolymer FC-4432 0.005 g were added into the bottle. After all the materials were mixed on a rolling-mill for 30 minutes, ⅛-inch stainless steel beads (400 g) were added to the bottle. This bottle was rotated on rolling-mill for 24 hours. The milled solution was collected by filtration. This solution was coated in a stainless steel sheet by a 10-mil Bird bar, and dried at 85° C. for 30 minutes, at 135° C. for 30 minutes and at 185° C. for 45 minutes. The coated film was easily released from coating substrate, and had very smooth surface. The surface resistivity was 7.04E+10Ω/□.

Preparation of ITB #91E: The preparation was the same as ITB #91D except that carbon black Special Black 4 dispersion 5.5 g (solid content 18.2%, prepared in lab) was used instead of the graphen dispersion, Vor-ink. ITB #91E sample had the same formulation and preparation procedure. The surface resistivity of this sample was 1.79E+10Ω/□. The mechanical properties of ITBs are summarized as below:

| | |
|---|---|
| Sample #91D Modulus: | 2779.36 MPa |
| Sample #91D Break Strength: | 56.67 MPa |
| Sample #91E Modulus: | 2797.69 MPa |
| Sample #91E Break Strength: | 40.31 MPa |

The two samples had the same modulus. Sample #91D with graphene had break strength improvement about 40% over sample #91E with carbon black.

Figure 5:
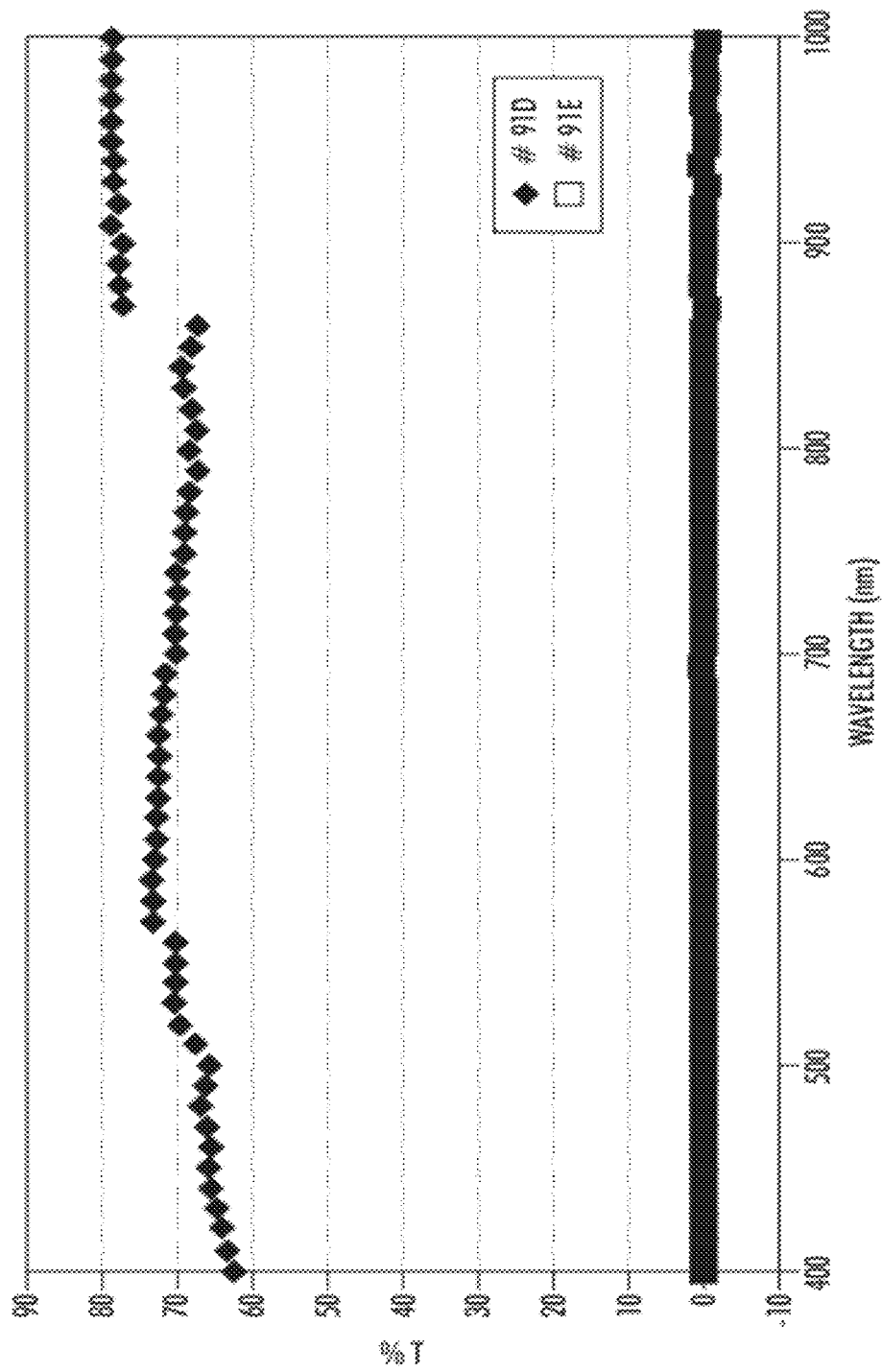
FIG. 5 shows the comparison of transparency for intermediate transfer belts.

The transparency of the samples under visible light range is as follows: ITB sample #91D with graphene had transparency 70% at wavelength 700 nm, compared to 0% for sample #91E with carbon black (FIG. 5).

The ITB coating can be self-released from metallic substrate. No extra release layer is needed. Graphene modified ITB belt showed improved flexibility, break strength and transparency in visible light wavelength range compared to the currently used ITB with carbon black as conductive fillers. Optical transparent ITB has lots of advantages such as providing digital registration of imaging, ITB life quality monitoring, and ITB coating quality control.

Other embodiments of the present teachings will be apparent to those skilled in the art from consideration of the specification and practice of the present teachings disclosed herein. It is intended that the specification and examples be considered as exemplary only, with the true scope and spirit of the present teachings being indicated by the following claims.

What is claimed is:

1. An intermediate transfer member comprising:
   a layer comprising a phenoxy resin having dispersed therein graphene particles at a loading of from about 0.1 weight percent to about 3.0 weight percent of the layer, wherein the phenoxy resin has the structure:

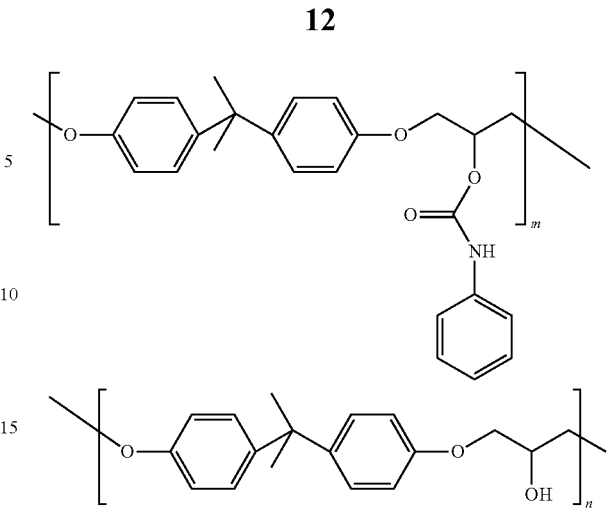

wherein m is from about 1 to about 399 and n is from about 399 to about 1.

2. The intermediate transfer member of claim 1, wherein the layer further comprises a polymer selected from the group consisting of polyesters, polyurethanes, polyimides, fluorinated polyimides, polyamideimides, polyolefins, polyamides, polyetherimides, polyphenylene sulfides, polysulfones, polycarbonates, PVDF and acrylics.

3. The intermediate transfer member of claim 1, wherein the layer comprises a transparency of about 70 percent at a wavelength of 700 nm.

4. The intermediate transfer member of claim 1, wherein the layer comprises a break strength of from about 50 MPa to about 90 MPa.

5. The intermediate transfer member of claim 1, wherein the layer comprises a surface resistivity of from about $10^8$ Ω/square to about $10^{13}$ Ω/square.

6. The intermediate transfer member of claim 1, wherein the layer comprises a thickness of from about 30 microns to about 400 microns.

7. The intermediate transfer member of claim 1, wherein the layer comprises a Young's Modulus of about 2,000 MPa to about 8,000 MPa.

8. The intermediate transfer member of claim 1, wherein n is from about 40 to about 399.

9. The intermediate transfer member of claim 1, wherein the layer comprises about 60 percent transmission to about 80 percent transmission at wavelengths of from about 400 nanometers to about 1000 nanometers.

10. The intermediate transfer member of claim 1, further comprising a substrate, wherein said layer is positioned on said substrate.

11. The intermediate transfer member of claim 1, further comprising conductive particles selected from the group consisting of carbon black, acetylene black, fluorinated carbon black, metal oxides, doped metal oxides polyaniline, polythiophenes, polyacetylene, poly(-phenylene vinylene), polyp-phenyl sulfide), pyrroles, polyindole, polypyrene, polycarbazole, polyazulene, polyazepine, poly(fluorine), polynaphthalene and mixtures thereof.

12. An intermediate transfer member comprising:
   a surface layer comprising a phenoxy resin having dispersed therein graphene at a loading of from about 0.1 weight percent to about 3.0 weight percent of the layer, wherein the phenoxy resin has the structure:

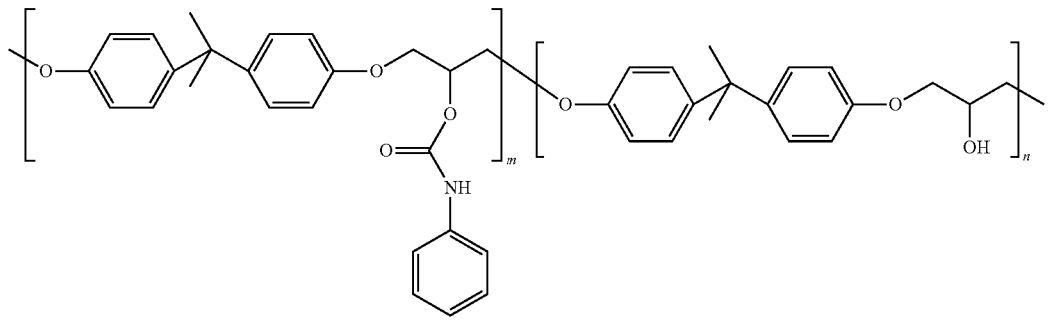

wherein m is from about 1 to about 399 and n is from about 399 to about 1, and wherein the layer comprises a transparency of about 70 percent at a wavelength of 700 nm.

13. The intermediate transfer member of claim 12, wherein the surface layer comprises a break strength of from about 50 MPa to about 90 MPa.

14. The intermediate transfer member of claim 12, wherein the surface layer comprises a thickness of from about 30 microns to about 400 microns.

15. The intermediate transfer member of claim 12, wherein the surface layer has a surface resistivity of from about $10^8$ Ω/square to about $10^{13}$ Ω/square.

* * * * *